(12) United States Patent
Bissantz

(10) Patent No.: US 9,430,856 B2
(45) Date of Patent: Aug. 30, 2016

(54) SYSTEM COMPRISING PROVIDING MEANS FOR PROVIDING DATA TO A USER

(71) Applicant: Nicolas Bissantz, Nürnberg (DE)

(72) Inventor: Nicolas Bissantz, Nürnberg (DE)

( * ) Notice: Subject to any disclaimer, the term of this patent is extended or adjusted under 35 U.S.C. 154(b) by 197 days.

(21) Appl. No.: 14/202,882

(22) Filed: Mar. 10, 2014

(65) Prior Publication Data

US 2015/0254874 A1 Sep. 10, 2015

(51) Int. Cl.
*G06T 11/20* (2006.01)

(52) U.S. Cl.
CPC .................... *G06T 11/203* (2013.01)

(58) Field of Classification Search
CPC ... G06T 11/001; G06T 11/203; G06T 11/206
See application file for complete search history.

(56) References Cited

U.S. PATENT DOCUMENTS

| | | | |
|---|---|---|---|
| 2006/0074866 A1* | 4/2006 | Chamberlain | G06F 17/246 |
| 2006/0136481 A1* | 6/2006 | Dehn | G06F 17/30371 |
| 2006/0218483 A1* | 9/2006 | Weitzman | G06F 17/246 715/212 |
| 2011/0298805 A1* | 12/2011 | Laurito | G06Q 40/06 345/440 |
| 2012/0159394 A1* | 6/2012 | Vuong | G06F 17/30126 715/833 |
| 2012/0324328 A1* | 12/2012 | Chamberlain | G06F 17/212 715/217 |
| 2013/0124391 A1* | 5/2013 | Wade | G06Q 40/04 705/37 |
| 2014/0101074 A1* | 4/2014 | Schonberg | G06Q 40/00 705/36 R |

* cited by examiner

*Primary Examiner* — Maurice L McDowell, Jr.
(74) *Attorney, Agent, or Firm* — Dilworth & Barrese, LLP.

(57) ABSTRACT

The present invention relates to a system comprising providing means for providing data to a user, comprising display means for displaying said provided data and comprising assessment means for assessing at least one characteristic of at least one of said displayed data, wherein the system further comprises at least one means for providing a color in at least one part of the area displayed by said display means, wherein the color or at least one characteristic of the color is dependend on said characteristic of said data.

17 Claims, 3 Drawing Sheets
(3 of 3 Drawing Sheet(s) Filed in Color)

FIG. 2

SYSTEM COMPRISING PROVIDING MEANS FOR PROVIDING DATA TO A USER

BACKGROUND OF THE INVENTION

The present invention relates to a system comprising providing means for providing data to a user.

It is known from the prior art to present a large number of data on a display of a computer such as economical data, technical data etc. The data may be arranged in a table comprising a number of columns as well as a number of lines.

Frequently such tables or any other arrays of data contain data as well as a lot of information related to different aspects of the data so that it might be difficult to maintain an overview and to make a quick assessment of the data, especially in case of a high number of data.

SUMMARY OF THE INVENTION

It is therefore an object of the present invention to provide a system comprising providing means for generating data which remarkably increases the possibility to quickly assess the data or at least some of them even if a high number of data is shown on the display.

This object is solved by a system according to the description herein. The system of the present invention comprises providing means for providing data. These providing means may be a memory or any other source of data which are linked to the display means so that the data provided by the providing means are shown to a user on the display means.

The system of the present invention further comprises display means for displaying said generated data. Those display means may comprise any kind of display and components which are required to present the data visibly to the user on a screen etc.

The system of the present invention further comprises assessment means for assessing at least one characteristic of at least one of said displayed data. This assessment may be made for example by a comparison between the displayed data and a reference value, such as a set value, a previous year value, the absolute value or the relative value of said data etc.

The system of the present invention further comprises at least one means for providing a colour in at least one part of the area displayed by said display means, wherein the colour or at least one characteristic of the colour is dependent on said characteristic of said data.

Accordingly, the present invention is based on the idea to allow an easy assessment of the data by use of at least one colour or by use of at least one characteristic of a colour, such as the depth of the colour which is linked to the characteristic of said data.

For example, the means for providing colour may be adapted so as to provide a certain colour, such as red, if the data or at least one of the data has a certain negative characteristic, such as a decrease of a turnover value, and to provide another colour, such as blue, if the data or at least one of the data has a certain positive characteristics, such as an increase of sales etc. The same may apply not only for the kind of colour, such as red or blue, but as well for any characteristic of the colour, such as the brightness of the colour. Accordingly, for example the sales are always linked to blue colour, however, the depth of the colour may be dependent on the number of the sales. Similarly, for example losses are always linked to red colour, however, the depth of the colour may be dependent on the number of losses.

In any case, the colour allows a user of the system to immediately assess one major information at a first sight even if a large number of data is shown on a display.

The display means may be a computer monitor or a display of a mobile device, such as of a tablet computer or the display of a smart phone.

In accordance with a further embodiment of the invention the system further comprises election means for electing one or more of said data preferably based on at least one criterion, wherein the elected data corresponds to the data, the characteristics of which is assessed by the assessment means. Accordingly there may be exactly one or at least one most important data of a larger number of data, such as the development of the turnover value, the characteristics of which is assessed by the assessment means.

This elected data may be fixed or may be electable by a user or the system. In the latter case the user can decide which data shall be assessed so as to obtain a quick information as regards the characteristic of the elected data.

The term "data" is a broad term which encompasses any kind of information.

The data can be figures, letters, sparklines, pictures, words etc.

The data can also be parameters, such as turnover values, sales, profits, losses, or the data can at least be associated with parameters.

The characteristic of said colour may be the depth of said colour. Accordingly it is possible to characterize a very negative characteristics with a dark red colour and a better or good characteristics with a bright red colour etc. Furthermore the characteristic of said colour may be the graduation of the colour, such as from dark to bright, from bright to dart or without graduation.

By use of said graduation of the colour it is possible to display a prognosis of the data which is also understood as a characteristic of the data. If for example the prognosis is that the profits will rise in the future, the colour may be from bright blue (for example at the bottom of the screen) to dark blue (in the area above the bottom of the screen) etc.

The characteristic of at least one of said displayed data may be a deviation of the data from a reference value, the position of said data in a range of data or the absolute value of said data or a prognosis of said data.

Said range may be defined by a number of previous data which are obtained over a certain period of time. Accordingly, it is possible to define a certain period of time, such as 12 month and to identify the range of the data between the maximum and the minimum of said data which have been obtained during this period of time. In a next step the actual, i.e. displayed data may be assessed by identifying the position of the data within said range. Based on this position the colour or at least one characteristics of said colour may be elected.

Said reference value or said range of data may be the value of the same parameter (such as turnover) which has been obtained at a previous point of time (such as 12 months ago) or in a previous time period (such as the last quarter of a year). Accordingly, the characteristic of the colour may be dependent on the absolute value of the data or may be dependent on another value which has been obtained in the past, such as in a reference time point or reference time interval.

Accordingly, the characteristic of the colour may be dependent on the location of the current data within a range of previous data.

For example a dark blue colour indicates that the data is the best or one of the best which has been obtained in the last 12 months (for example the data is located in the best third). For example a dark red colour indicates that the data is one of the worst which has been obtained in the last 12 months (for example the data is located in the worst third).

The reference value or said range of data may be displayed on the screen. However, the present invention also encompasses the case wherein the reference value or said range of data is not displayed on the screen but is calculated or provided by the system.

In accordance with a further aspect of the invention the characteristic of at least one of said displayed data is the kind of data. Accordingly, it is possible to always use the blue colour for profits and always use the red colour for costs, regardless of their absolute or relative value.

Furthermore, the data may be associated to at least one parameter, such as a region, and the colour is elected depending on said characteristic of said data which is associated with one of the parameters which is elected by a user of the system. For example, if the regions are north, east, south, west and a turnover value is available for each of said regions, the user may elect one of the regions, such as north, and the colour or the characteristic of the colour is dependent on the value associated with said elected region (such as the turnover value for the region north). The data which are associated with the elected parameter (such as a region) may be stored or displayed as a separate file or screen view together with the associated colour. The mechanism of separating a parameter (such as "region") into a plurality of parameters (such as "north, east, south, west") should by independent on any other manipulation of the data made by a user, such as separating any other parameter into sub-parameters.

The election of a parameter may be performed by a mouse click or by pressing a key of the keyboard or by moving the mouse cursor on the screen to said parameter (without pressing any key). This allows a user to quickly assess the data by simply moving the mouse cursor over the screen.

According to a further aspect of the invention, said means for providing a colour are adapted so as to provide a colour to the total area displayed by said display means, i.e. all over the screen, or only to a part of the total area displayed by said display means, such as only or preferably in the bottom part of the screen.

It is conceivable to provide a colour as a background colour all over the area which is displayed by the display means or only to a part of the displayed area. In any case the size of the coloured area should be elected so as to allow a quick assessment of the characteristics of the data.

Said means for providing a colour may be adapted to provide colour to the data themselves or to the background of said data. Accordingly it is possible to provide for example a turnover number in certain colour and/or the background thereof as well.

Furthermore, the colour and/or the at least one characteristic of said colour is fixed or may be elected by a user of the system. Accordingly, the user for example may decide that the red colour is always used for losses and the blue colour is always used for profits.

In accordance with a further embodiment of the invention said means for providing a colour are adapted so as to provide only two colours, wherein the two colours are preferably blue and red. Of course the use of a higher number of colour is conceivable and part of the invention as well.

Furthermore, the data may be arranged in a table, in lines, columns or in any other arrangement.

The data may consist of or comprise spark lines.

The display means may be adapted so as to display a list of data together with an indicator associated to said data, wherein the indicator is coloured in said colour provided by said means for providing a colour. This list is a kind of summary of data, preferably of several parameters, which are associated with an indicator, such as a coloured area located near the parameter.

Such kind of list allows a user of the system to quickly obtain an overview which parameter is associated with which characteristics.

Furthermore the system may be adapted so as to provide no colour to data. This case may happen if the assessment means cannot make any positive or negative assessment or cannot correlate the data with any specific characteristic, which is linked to a certain colour.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further advantages of the invention are demonstrated in the embodiment according to FIGS. 1 to 3:

DESCRIPTION OF THE PREFERRED EMBODIMENTS

Figure 1:
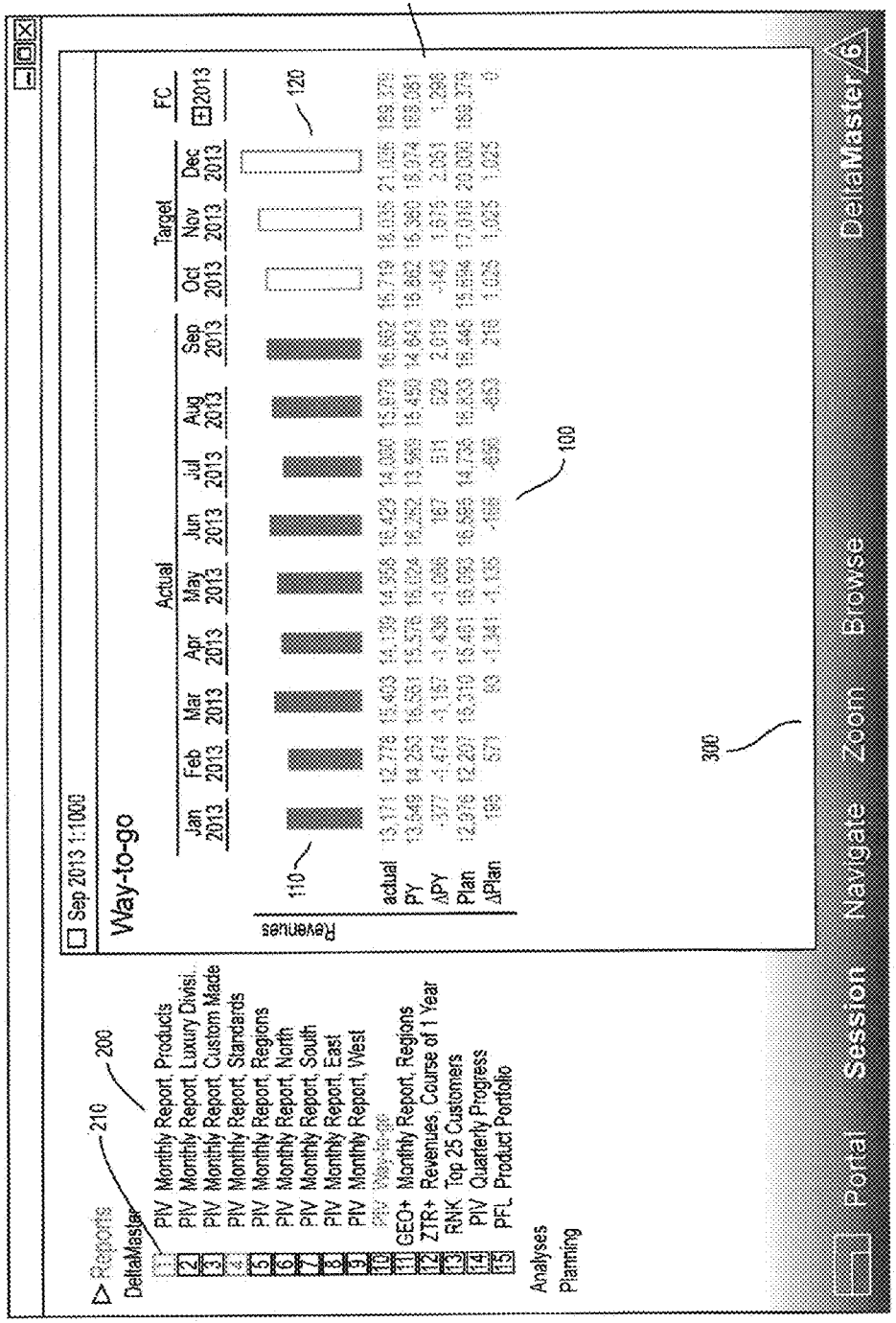

The table T shown in FIG. 1 contains a number of absolute and relative turnover values 100 which have been obtained between January and September of a year. As shown in FIG. 1 a bar chart 110 is located above said data, which shows the actual turnover numbers visually.

FIG. 1 further provides a forecast for the turnover for the rest of the year, i.e. for the months October to December which is indicated by further numbers and bars 120 which are not filled with colour.

On the left hand side of FIG. 1 a list of different parameters 200 which are each associated with an indicator, such as a field 210 which might contain an abbreviation or the number of the respective parameter. The fields may be either blue or red or grey, which depends on the characteristics of said parameter. If for example the turnover has developed in a positive manner, the indicator is blue, if for example the costs have developed in a negative matter, the indicator is red. If no clear trend is available, the colour may be grey.

This list of parameters together with the colouration allows a user to immediately assess the quality of said parameter.

The user can elect one of these parameters. Upon election of a parameter (in the present example "Way-to-go") the data belonging to this parameter are displayed in a table T as shown in FIG. 1.

In the present example according to FIG. 1 the user has elected the way-to-go as a parameter. Since the development and/or the forecast of this parameter is positive the display means provide a certain colour to the lower part 300 of the screen, which in the present example is a grey colour with a certain graduation/shade. Of course, the colours presented in the specification, claims and drawings are examples only and do not limit the scope of protection.

This allows a user to immediately assess the characteristic of a parameter, i.e. the user will immediately understand from the colour that the turnover or the development thereof is positive without the need to study the figures in detail.

Figure 2:
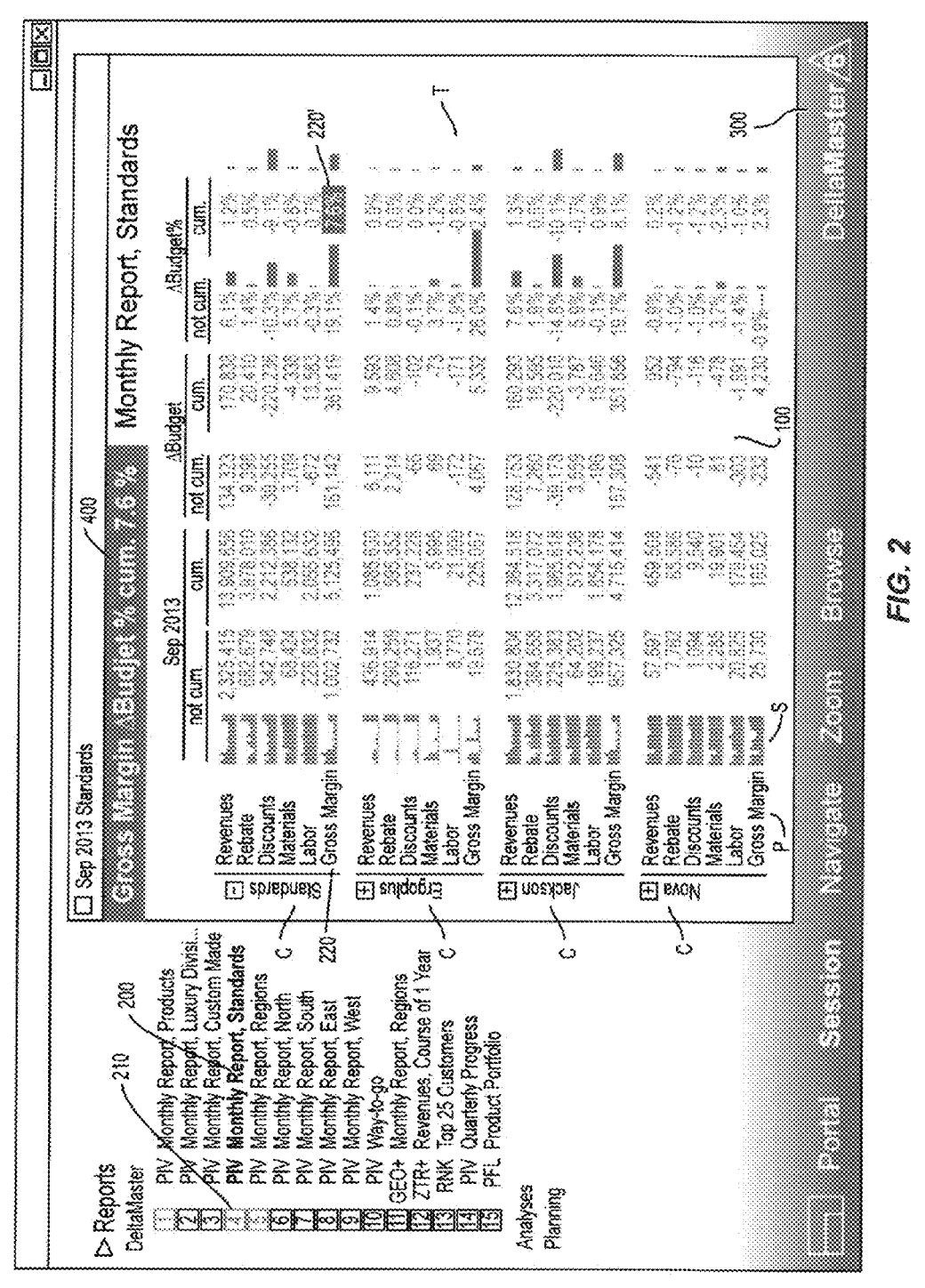

FIG. 2 shows another example of a screen shot with a table T which comprises a number of parameters P in different categories C. Each of the parameters is provided with a sparkline S and with numbers 100 reflecting not cumulated values, cumulated values as absolute numbers as well as deviations to the previous years in absolute and relative numbers.

As shown in FIG. 2 the bottom part 300 of the screen is blue. This indicates to a user that at least one important parameter has a positive characteristics. Further, the indicator 210 which is located besides the elected parameter 200 is blue as well.

Said important, i.e. elected parameter in the present example is the gross margin 220 and in particular the value Δ Budget %; the value 220' of which is highlighted in the table T with dark blue colour. This indicates to a user that this important parameter is satisfying.

Due to the fact that in the present example the amount of Δ Budget % referring to the gross margin is positive (7.6%), not only the value as such but also a part (in the present example the lower portion 300) of the screen is coloured in blue colour with a shading of the blue colour.

The name and value of the elected parameter is listed above the table at location 400 so that the user may easily understand which parameter is the reference parameter, i.e. the elected parameter the value or development of which decides over the colour of the screen.

Figure 3:
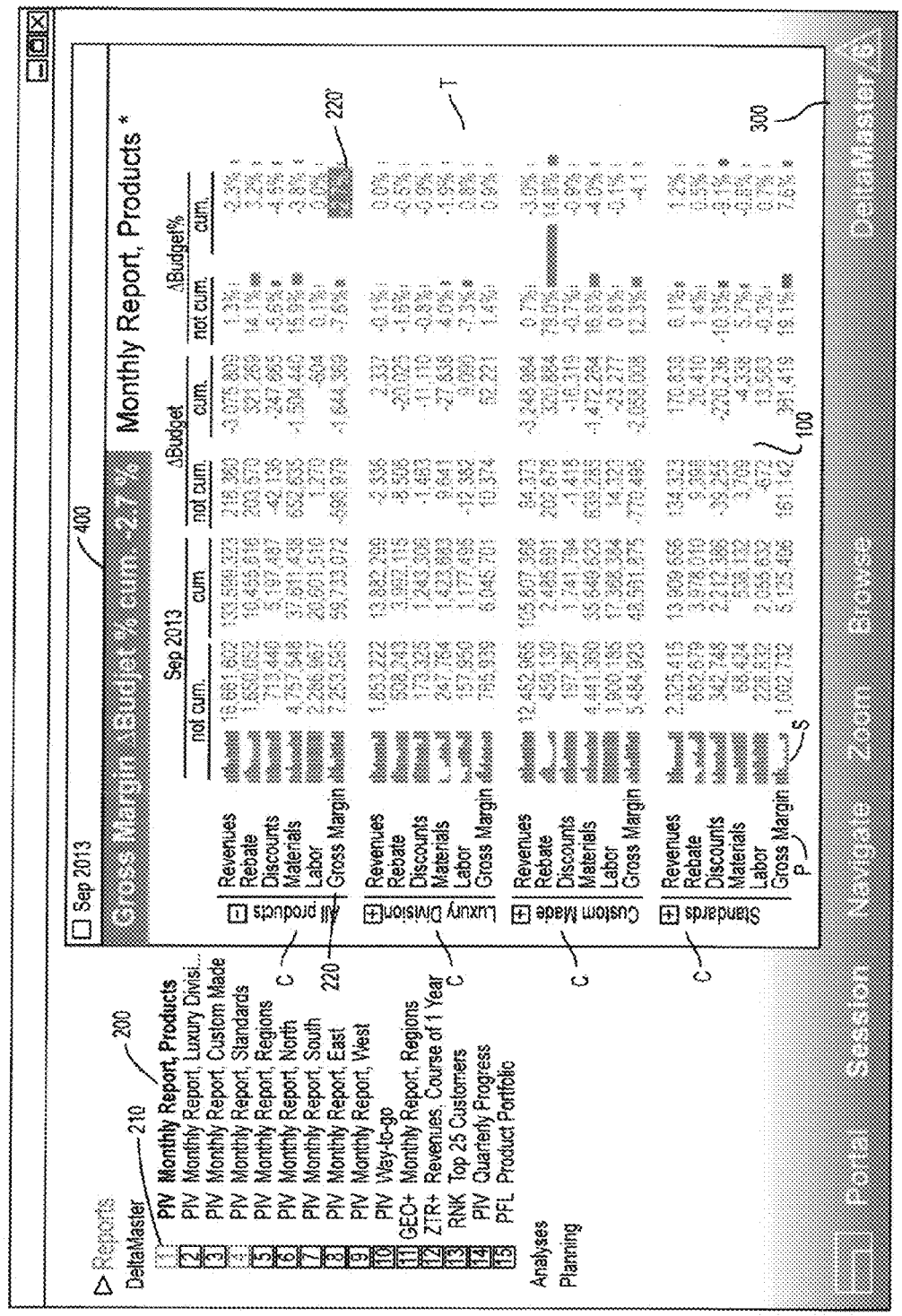

FIG. 3 shows a further example of a screen shot which is similar to the example shown in FIG. 2.

Same reference numerals are used for the same items as in FIG. 2.

In the example of FIG. 3 the important parameter is negative. Due to this not satisfying value of the parameter 200 in FIG. 3 the bottom part 300 of the screen is coloured in red.

In the present example one colour has been elected for positive characteristic and another colour has been elected for negative characteristic of the data.

However, it is also conceivable to use the same colour for the same data, such as a certain parameter, such as blue for the turnover, and to adapt a characteristic of said colour depending on the quality of said parameter. Accordingly, it is conceivable, the elect dark blue for good turnover values and a bright blue for bad or worse turnover values or vice versa.

Furthermore, it is conceivable, the reference, i.e. the elected parameter, the characteristics of which is assessed may be fixed, i.e. given by the system, or may be electable by a user.

In the latter case the user can make a decision which parameter is of high relevance and can elect this parameter as a reference parameter, the characteristic of which is assessed.

The assessment of the parameter may for example be made by a comparison with a threshold, by a comparison with the value of the same parameter one year (or any other period of time) ago etc., by assessing the position of the value within a range of parameters etc. The range of parameters may be between the lowest and the highest parameter value in a reference time period, such as within the last year etc.

The invention claimed is:

1. A system, comprising:
providing means for providing data, comprising display means for displaying said provided data, wherein the system is configured to assess at least one characteristic of at least one of said displayed data, wherein the system is configured to provide a colour in at least one part of the area displayed by said display means, and the colour or at least one characteristic of the colour is elected depending on said characteristic of said data, wherein the system is configured to elect one or more of said data or one or more parameters associated to said data based on at least one criterion, and the system is adapted to assess the characteristic of the elected data, wherein the elected data and/or the associated parameter are highlighted on the area displayed by said display means.

2. The system according to claim 1, wherein the display means is a computer monitor or a display of a mobile device.

3. The system according to claim 1, wherein the data are elected from the group comprising parameters, numbers, letters, sparklines and symbols.

4. The system according to claim 1, wherein the characteristic of said colour is the depth of said colour.

5. The system according to claim 1, wherein the characteristic of at least one of said displayed data is a deviation between the data from a reference value, the position of said data in a range of data or the relative or absolute value of said data.

6. The system according to claim 5, wherein the reference value or said range of data is (are) the value (s) of the same parameter obtained at a previous point of time or in a previous time period.

7. The system according to claim 5, wherein said range of data is predefined by the user or the system or said range of data is defined by a number of existing data, preferably by a number of previous data which are obtained over a certain period of time.

8. The system according to claim 7, wherein the data which are obtained over a certain period of time comprise a maximum and a minimum value and said range of data is limited by said maximum and said minimum value.

9. The system according to claim 1, wherein the characteristic of at least one of said displayed data is the kind of data, such as economical or technical data.

10. The system according to claim 1, wherein the data are associated to at least one parameter, such as a region, and the colour is elected depending on said characteristic of said data which is associated with one of the parameters, which parameter is elected by a user of the system.

11. The system according to claim 10, wherein the election of data or of a parameter is performed by a mouse click or by pressing a key of the keyboard or moving the mouse cursor on the screen to said parameter or data.

12. The system according to claim 1, wherein the colour is provided to the total area displayed by said display means or only to a part of the total area displayed by said display means and/or providing the colour includes providing a colour gradient.

13. The system according to claim 1, wherein the color is provided to the data themselves or the background of said data.

14. The system according to claim 1, wherein the colour and/or the at least one characteristic of said colour is fixed or may be elected by a user of the system.

15. The system according to claim 1, wherein providing the color includes providing only two colours.

16. The system according to claim 1, wherein the displayed data are arranged in a table and/or comprise spark lines.

17. The system according to claim 1, wherein the display means are adapted to display a list of data together with an indicator associated to said data, and the indicator is coloured in said colour provided.

* * * * *